US012603578B2

(12) United States Patent
Chan

(10) Patent No.: US 12,603,578 B2
(45) Date of Patent: Apr. 14, 2026

(54) RESONANT CONVERTER CAPABLE OF ADAPTIVELY TUNING QUALITY FACTOR BASED ON LOAD

(71) Applicant: Acer Incorporated, New Taipei City (TW)

(72) Inventor: Tzu-Tseng Chan, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 163 days.

(21) Appl. No.: 18/584,197

(22) Filed: Feb. 22, 2024

(65) Prior Publication Data

US 2025/0175087 A1     May 29, 2025

(30) Foreign Application Priority Data

Nov. 29, 2023    (TW) ................................. 112146216

(51) Int. Cl.
    *H02M 3/335* (2006.01)
    *H02M 1/00* (2006.01)
    *H02M 3/00* (2006.01)

(52) U.S. Cl.
    CPC ..... *H02M 3/33569* (2013.01); *H02M 1/0058* (2021.05); *H02M 3/01* (2021.05); *H02M 3/015* (2021.05)

(58) Field of Classification Search
    CPC ............. H02M 1/0003; H02M 1/0009; H02M 1/0025; H02M 1/0048; H02M 1/0054;
    (Continued)

(56) References Cited

U.S. PATENT DOCUMENTS 5,297,014 A  *  3/1994  Saito .................... H02H 7/1213
                                                    363/21.13
10,411,610 B2     9/2019  Luo
                      (Continued)

FOREIGN PATENT DOCUMENTS

CN        104901550 B  *  8/2018
TW        201838300 A     10/2018
TW        202101882 A     1/2021

OTHER PUBLICATIONS

Chinese language office action dated Jul. 8, 2024, issued in application No. TW 112146216.

*Primary Examiner* — Thienvu V Tran
*Assistant Examiner* — Shahzeb K Ahmad
(74) *Attorney, Agent, or Firm* — McClure, Qualey & Rodack, LLP

(57) ABSTRACT

Provided is a resonant converter capable of adaptively tuning a quality factor based on load. The resonant converter includes a resonant tank having an inductor part whose inductance is tunable according to a first control potential, a magnetizing inductor, and a capacitor part whose capacitance is tunable according to a second control potential. The resonant converter detects the rectifying current of its output stage for responding to the load state of the resonant converter. The resonant converter outputs the first and second control potentials in response to the load state, tuning the equivalent inductance of the inductor part, the equivalent capacitance of the capacitor part, or both, thereby changing the quality factor of the resonant converter.

7 Claims, 5 Drawing Sheets

200

(58) Field of Classification Search
CPC .... H02M 1/0058; H02M 1/42; H02M 1/4241;
H02M 1/44; H02M 1/12; H02M 3/01;
H02M 3/015; H02M 3/156; H02M 3/158;
H02M 3/335; H02M 3/33507; H02M
3/3353; H02M 3/33538; H02M 3/33569;
H02M 3/33573; H02M 7/4811; H02M
7/4815; H02M 7/4818; H02M 7/4826
See application file for complete search history.

(56) References Cited

U.S. PATENT DOCUMENTS

| | | | |
|---|---|---|---|
| 11,211,864 B2 | 12/2021 | Chan | |
| 2015/0124487 A1* | 5/2015 | Fu ......................... | H02M 3/015 |
| | | | 363/17 |
| 2020/0403507 A1* | 12/2020 | Chan ..................... | H02M 1/126 |
| 2024/0275259 A1* | 8/2024 | Zeng ..................... | G01R 19/32 |

* cited by examiner

100

1

RESONANT CONVERTER CAPABLE OF ADAPTIVELY TUNING QUALITY FACTOR BASED ON LOAD

CROSS REFERENCE TO RELATED APPLICATIONS

This Application claims priority of Taiwan Patent Application No. 112146216 filed on Nov. 29, 2023, the entirety of which is incorporated by reference herein.

BACKGROUND OF THE INVENTION

Field of the Invention

The present disclosure generally relates to a converter, and in particular, to a resonant converter capable of adaptively tuning a quality factor based on load.

Description of the Related Art

Resonant converters have become a hot topic in the field of power electronics because they meet the strict performance requirements on modern power supply designs. The topology of an LLC (inductor-inductor-capacitor) resonant converter belongs to a huge family of resonant converters, and inherently includes a resonant tank. The resonant tank is a resonant circuit, having a set of inductors and a set of capacitors jointly oscillating at a specific frequency (referred to as the resonant frequency). For example, an LLC resonant converter can turn on a power switch at the zero-voltage point and turn off a diode at the zero-current point using three resonant components (for example, two inductors and one capacitor), thereby achieving flexible switching of low power consumption and high conversion efficiency.

The design of conventional LLC resonant converters includes their frequency operating range and bandwidth under a fixed Quality Factor (also known as the Q value). When the output load of a conventional LLC resonant converter rises or becomes heavy, the output voltage of the conventional LLC resonant converter will drop due to the power loss in the connection wire. At this moment, the conventional resonant converter may decrease its switching frequency to obtain more voltage gain for a stable voltage output. However, under conditions where the load is heavy or the peak dynamic response is too frequent, there is often a problem of insufficient voltage gain.

BRIEF SUMMARY OF DISCLOSURE

Accordingly, the present disclosure provides a brand new solution to resolve the problems confronted by conventional resonant converters.

In some preferred exemplary embodiments, the present disclosure provides a resonant converter capable of adaptively tuning a quality factor based on the load. According to the exemplary embodiment, the resonant converter may include a power switch circuit, a resonant tank, a transformer, an output stage, an averaging circuit, and a controller. The power switch circuit is configured to receive an input DC (direct-current) potential, and generate a switching potential. The resonant tank is configured to receive the switching potential, and may include an inductor part, having inductance adjusted according to a first control potential; a magnetizing inductor; and a capacitor part, having capacitance adjusted according to a second control potential. The transformer at least includes a primary winding, and a first secondary winding; wherein the primary winding is coupled to the magnetizing inductor. The output stage is coupled to the transformer, and includes a rectifying device, a detecting resistor, and an output capacitor. The averaging circuit is coupled to a first terminal and a second terminal of the detecting resistor, to obtain and output the average potential, which corresponds to the average current flowing through the rectifying device. The controller is configured to receive the average potential, and output the first control potential and the second potential based on the average potential.

Compared to the conventional resonant converter, the resonant converter of the present disclosure capable of adaptively tuning a quality factor based on the load, can detect the rectifying current of the output stage to response the load situation. Further, the resonant converter adaptively adjusts the resonant configuration and quality factor according to the load situation; thereby adjusting the output gain of the resonant converter to avoid insufficient output voltage.

BRIEF DESCRIPTION OF DRAWINGS

The disclosure can be more fully understood by reading the subsequent detailed description and examples with references made to the accompanying drawings, wherein.

DETAILED DESCRIPTION OF THE INVENTION

In order to illustrate the purposes, features and advantages of the disclosure, the embodiments and figures of the present disclosure are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. In addition, the term "couple" is intended to mean either an indirect or direct electrical connection. Accordingly, if one device is coupled to another device, that connection may be through a direct electrical connection, or through an indirect electrical connection via other devices and connections.

Figure 1:
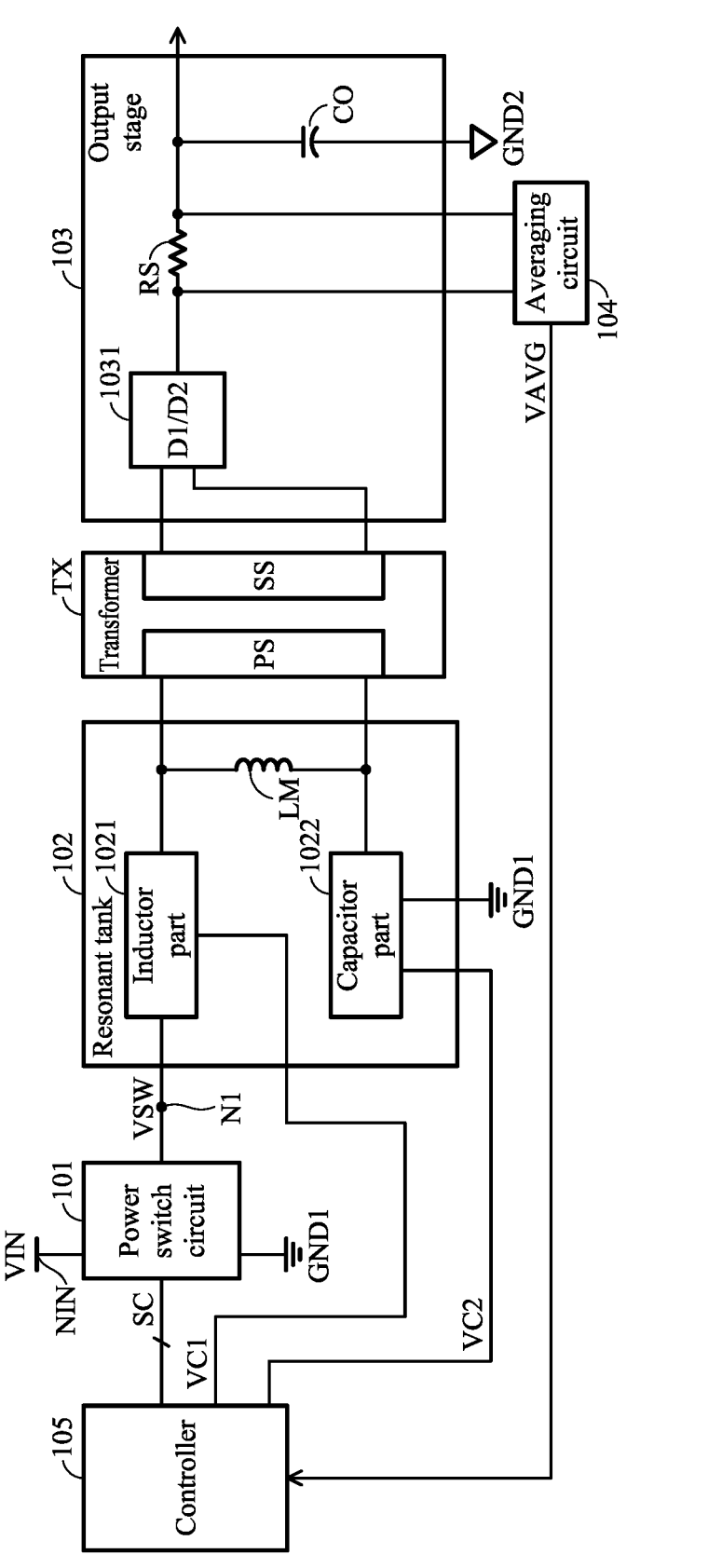
FIG. 1 is a schematic diagram showing a resonant converter according to an exemplary embodiment of the present disclosure, capable of adaptively tuning a quality factor based on the load.

FIG. 1 is a schematic diagram showing a resonant converter 100 according to an exemplary embodiment of the present disclosure, capable of adaptively tuning a quality factor based on the load.

The resonant converter 100, capable of adaptively tuning a quality factor based on the load thereof, can be applied to the information apparatus such as the desktop computer, the notebook computer, or the all-in-one computer. As shown in FIG. 1, the resonant converter 100, capable of adaptively tuning a quality factor based on the load includes a power switch circuit 101, a resonant tank 102, a transformer TX, an output stage 103, an averaging circuit 104, and a controller 105.

The power switch circuit 101 is arranged between an input node NIN and a reference ground GND1. The power switch circuit 101 is configured to convert a direct-current (DC) potential (i.e., voltage) VIN to a switching potential VSW, according to at least a control signal SC output from the controller 105, and output the switching potential VSW to a first node N1 for the resonant tank 102. The switching potential VSW is a high-frequency square-ware potential.

The resonant tank is a tunable impedance network, and configured to have equivalent impedance, which can to be tuned according to control potentials. The resonant tank 102 includes an inductor part 1021, a magnetizing inductor LM, and a capacitor part 1022. The inductance of the inductor part 1021 is tuned at least according to a first control potential VC1. The capacitance of the capacitor part 1022 is tuned at least according to a second control potential VC2. The adjustment method for the overall inductance of the inductor part 1021 and the overall capacitance of the capacitor part 1022 will be further described in detail below. After receiving the switching potential VSW, the resonant tank 102 converts the switching potential VSW to a sinusoid potential at fundamental frequency.

The transformer TX, for example includes a primary side PS and a secondary side SS. The primary side PS is coupled to the magnetizing inductor LM to induce the sinusoid potential generated by the resonant tank 102 to the secondary side SS. The primary side PS includes a primary winding (also called a coil). The secondary side SS has a single secondary winding, or includes a first secondary winding and a second secondary winding. In additional, the transformer TX can boost or buck (step down) the sinusoid potential by setting the turn ration of the secondary side SS to the primary side PS.

Taking the secondary side NS having the single secondary winding for example, the output stage 103 is coupled to the winding of the secondary side SS. The output stage 103 has a rectifying device 1031, for example which at least includes a first rectifying component D1, an output capacitor CO, and a detecting resistor RS. The output stage 103 rectifies the sinusoid potential induced by the secondary side SS to a DC potential and store it to the output capacitor CO. In addition, take the secondary side NS having the first secondary winding and the second secondary winding for example. At this moment, in addition to the first rectifying component D1, the output capacitor CO, and the detecting resistor RS, the output stage 103 may further include a second rectifying component D2.

The averaging circuit 104 is coupled to the two terminals of the detecting resistor RS, and outputs the average potential VAVG. In the case of a single secondary winding, the average potential VAVG corresponds to the average of the rectified current flowing through the first rectifying component D1. In the case of having the first secondary winding and the second secondary winding, the average potential VAVG corresponds to the average of the sum of two rectified currents respectively flowing through the first rectifying component D1 and the second rectifying component D2.

The controller 105 receives the average potential VAVG, and outputs the first control potential VC1 and the second control potential VC2 to the inductor part 1021 and the capacitor part 1022 according to the average potential VAVG.

As can be seen from the above embodiment, the controller 105 in the resonant converter 100 of the present embodiment, tunes the overall inductance of the inductor part 1021, and the overall capacitance of the capacitor part 1022 according to the average potential VAVG corresponding to the load of the resonant converter 100. Therefore, the resonant converter 100 can adaptively tune its quality factor, and thereby changing the output gain of the resonant converter 100.

The following embodiment will introduce the detailed structure and operation method of the resonant converter according to the present disclosure that can adaptively tune the quality factor based on the load. It should be understood that the drawings and descriptions are only examples and are not intended to limit the scope of the disclosure.

Figure 2:
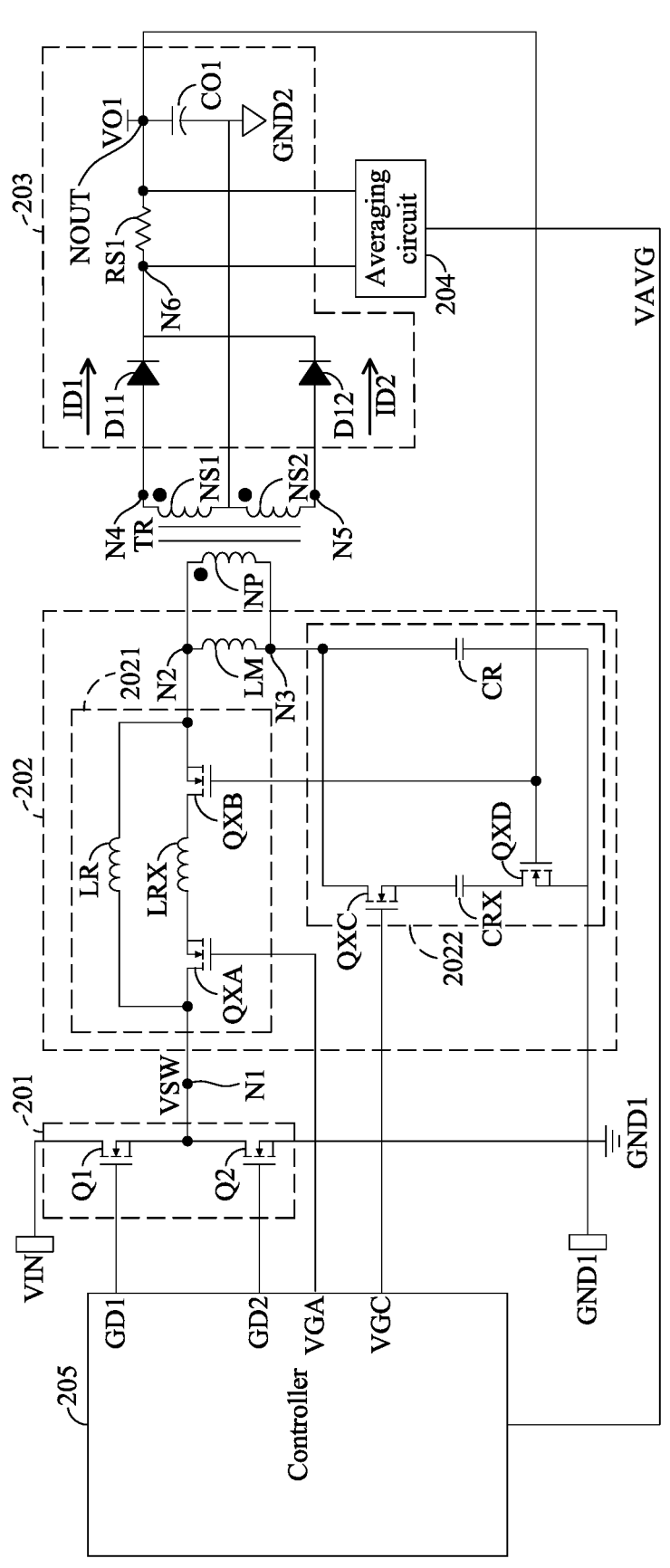
FIG. 2 is a circuit diagram showing a resonant converter according to another exemplary embodiment of the present disclosure, which can adaptively tune the quality factor based on the load.

FIG. 2 is a circuit diagram showing a resonant converter 200 according to another exemplary embodiment of the present disclosure, which can adaptively tune the quality factor based on the load. In the embodiment of FIG. 2, the resonant converter 200 includes a power switch circuit 201, a resonant tank 202, a transformer TR, an output stage 203, an averaging circuit 204, and a controller 205.

In this embodiment, the power switch circuit 201 includes a first power switch Q1, a second power switch Q2, wherein the first power switch Q1 and the second power switch Q2 are connected in series, and further coupled between a direct-current (DC) potential VIN and a first reference ground GND1. In this embodiment, the first power switch Q1 and the second power switch Q2, for example, are NMOS transistor (N-type Metal-Oxide-Semiconductor Transistor). The control terminals (control gates) of the first power switch Q1 and the second power switch Q2 respectively receive the first switching potential GD1 and the second switching potential GD2 output by the controller 205. By driving the first power switch Q1 and the second power switch Q2 turned-on and turned-off alternately, the power switch circuit 201 generates a switching potential VSW at a first node N1.

The resonant tank 202 receives the switching potential VSW, and includes an inductor part 2021, a magnetizing inductor LM, and a capacitor part 2022. The inductor part 2021 is coupled to the first node N1 and a second node N2, and the magnetizing inductor LM is coupled to the second node N2 and a third node N3, and the capacitor part 2022 is coupled to the third node N3 and the first reference ground GND1.

The inductor part 2021 includes a resonant inductor LR, at least one auxiliary inductor LRX, and a first auxiliary switch set. The resonant inductor LR is coupled to the first node N1 and the second node N2. The first auxiliary switch set may have one or more auxiliary switches. The auxiliary inductor LRX and the first auxiliary switch set are connected in series, and are further arranged between the first node N1 and the second node N2. In this embodiment, the first auxiliary switch set, for example, has two auxiliary switches QXA and QXB, as shown in FIG. 2. The auxiliary switch QXA connects the first node N1 and one terminal of the auxiliary inductor LRX, and the auxiliary switch QXB connects the second node N2 and the other terminal of the auxiliary inductor LRX.

The capacitor part 2022 includes a resonant capacitor CR, and at least one auxiliary capacitor CRX, and a second auxiliary switch set. The resonant capacitor CR is coupled to the third node N3 and the first reference ground GND1. The second auxiliary switch set may have one or more auxiliary switches. The auxiliary capacitor CRX and the second auxiliary switch set are connected in series, and are further arranged between the third node N3 and the first reference ground GND1. In this embodiment, the second auxiliary switch set, for example has two auxiliary switches QXC and QXD, as shown in FIG. 2. The auxiliary switch QXC connects the third node N3 and one terminal of the auxiliary capacitor CRX, and the auxiliary switch QXD connects the first reference ground GND1 and the other terminal of the auxiliary capacitor CRX.

In this embodiment, the auxiliary switches QXA, QXB, QXC, and QXD, for example, are NMOS transistors. The gates (control terminals) of the auxiliary switches QXB and QXD are coupled to the output potential VO1 of the resonant converter 200. Therefore, the auxiliary switches QXB and QXD are turned-on when the resonant converter 200 outputs stably. The gates (control terminals) of the auxiliary switches QXA and QXC are coupled to a first control potential VGA and a second control potential VGC, respectively. According to the first control potential VGA and the second control potential VGC, the auxiliary switches QXA and QXC may change the connection state of the resonant inductor LR and the auxiliary inductor LRX, and also may change the connection state of the resonant capacitor CR and the auxiliary capacitor CRX. In other words, the connecting configuration of the inductor part 2021 and the capacitor part 2022 can be changed, and the overall inductance of the inductor part 2021 and the overall capacitance of the capacitor part 2022 can be adjusted, and therefore, the Quality Factor (or Q value) of the resonant converter 200 is tuned (or changed).

In some embodiments, the auxiliary switches QXB and QXD can be omitted to directly connect the other terminal of the auxiliary inductor LRX to the second node N2, and connect the other terminal of the auxiliary capacitor CRX to the reference ground GND1.

In this embodiment, the transformer TR includes a primary winding NP, a first secondary winding NS1, and a second secondary winding NS2. The primary winding NP is coupled to the second node N2 and the third node N3, and is connected in parallel with the magnetizing inductor LM. One terminal of the first secondary winding NS1 is coupled to a fourth node N4, and the other terminal of the first secondary winding NS1 is coupled to a second reference ground GND2. One terminal of the second secondary winding NS2 is coupled to a fifth node N5, and the other terminal of the second secondary winding NS2 is coupled to the second reference ground GND2.

The output stage 203 includes a first rectifying component D11, a second rectifying component D12, a detecting resistor RS1, and an output capacitor CO1. One terminal of the first rectifying component D11 is coupled to the fourth node N4, and the other terminal of the first rectifying component D11 is coupled to a sixth node N6. One terminal of the second rectifying component D12 is coupled to the fifth node N5, and the other terminal of the second rectifying component D12 is coupled to the sixth node N6. One terminal of the detecting resistor RS1 is coupled to the sixth node N6, and the other terminal of the detecting resistor RS1 is coupled to an output node NOUT. The output capacitor CO1 is coupled between the output node NOUT and the second reference ground GND2. In some embodiments, the first rectifying component D11 and the second rectifying component D12, for example, are diodes for full-wave rectification. In some embodiments, the secondary side of the transformer TR may have a single secondary winding, and thus the output stage 203 may have a single rectifying component (diode) for half-wave rectification. The notations ID1 and ID2 indicate the first (rectifying) current and the second (rectifying) current through the first rectifying component D11 and the second rectifying component D12, respectively.

The averaging circuit 204 is coupled to the sixth node N6 and the output node NOUT. Further, the averaging circuit 204 and the detecting resistor RS1 are connected in parallel.

The controller 205 receives the average potential VAVG, and outputs the first control potential VGA and the second control potential VGV to the auxiliary switches QXA and QXC. In some embodiments, the controller 205, for example, is a Micro-processing Control Unit (MCU), a central processing unit (CPU), or an embedded controller, and the first switching potential GD1 and the second switching potential GD2 output by the controller 205 are complementary pulse modulation potentials (signals).

Below, the operation of the resonant converter 200 according to the embodiment of the present disclosure will be described with reference to FIG. 2.

In the output stage 203, the first current ID1 flowing through the first rectifying component (diode) D11 and the second current ID2 flowing through the second rectifying component (diode) D12, establish a detecting voltage VRS (not shown in FIG. 2) across the detecting resistor RS1.

Figure 3:
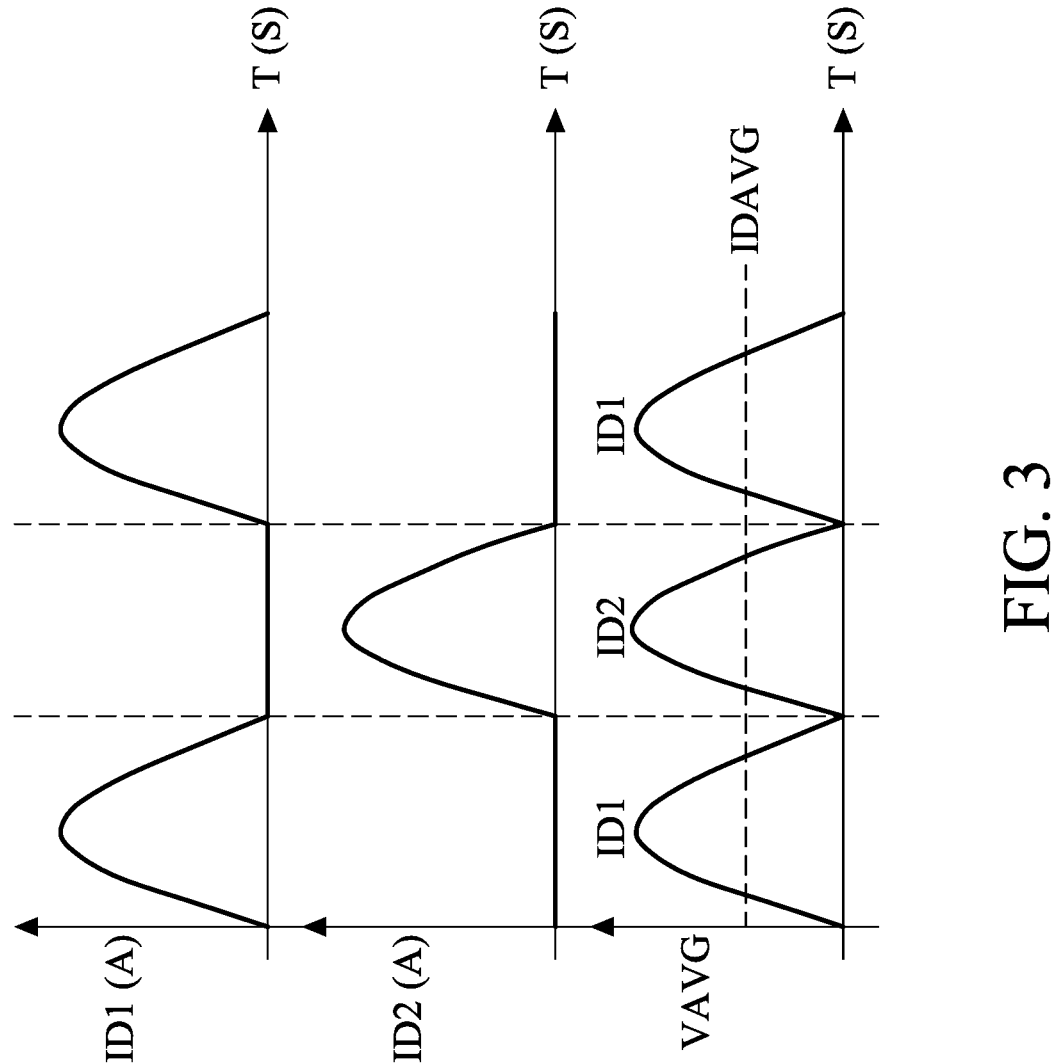
FIG. 3 is a schematic diagram showing the first current ID1, the second current ID2, and the average potential VAVG of the output stage of the resonant converter.

FIG. 3 is a schematic diagram showing the first current ID1, the second current ID2 and the average potential VAVG. The detecting voltage VRS corresponds to the sum of the first current ID1 and the second current ID2. In other words, the detecting voltage VRS corresponds to the sum current (equal to ID1+ID2). The average circuit 204 receives the detecting voltage VRS and obtains and output the average potential VAVG to the controller 205, wherein the average potential VAVG corresponds to the average current IDAVG of the current sum (ID1+ID2). The current sum (ID1+ID2) and the average potential VAVG can respond the load state of the resonant converter 200.

After receiving the average potential VAVG, the controller 205 generates an average current value IDA (not shown in FIG. 2) according to the average potential VAVG. In some embodiments of the present disclosure, the controller 205 may obtain the average current value IDA through dividing the average potential VAVG by a fixed resistance (value).

In some embodiments of the present disclosure, the controller 205 may tune the quality factor according to the average current value IDA obtained from the average potential VAVG. The resonant structure of the resonant converter 200 as shown in FIG. 2 can be set to three resonant states corresponding to three different quality factors.

First Resonant State

When the controller 205 determines that the average current value IDA is less than 65% of the maximum current value IOMAX of the output load (i.e., IDA<IOMAX×65%), the controller 205 tunes the quality factor (Q value), for example, to Q=2.0.

Second Resonant State

When the controller 205 determines that the average current value IDA is more than or equal to 65% of the maximum current value IOMAX, and less than 85% of the maximum current value IOMAX of the output load (i.e., IOMAX×65%≤IDA<IOMAX×85%), the controller 205 tunes the quality factor (Q value), for example, to Q=1.0.

Third Resonant State

When the controller 205 determines that the average current value IDA is more than 85% of the maximum current value IOMAX of the output load (i.e., IDA>IOMAX×85%), the controller 205 tunes the quality factor (Q value), for example, to Q=0.5.

Referring to the following formula (1), $$Q = \frac{\sqrt{LRT/CRT}}{RAC} \qquad (1)$$

it can be seen that the quality factor (Q value) is determined according to the alternating-current (AC) reflective resistance RAC, the total resonant inductance LRT, and the total resonant capacitance CRT;

wherein the total resonant inductance LRT is the overall inductance of the inductor part 2021, and the total resonant capacitance CRT is the overall capacitance of the capacitor part 2022.

The AC reflective resistance RAC is defined by the formula (2):

$$RAC = \frac{8}{\pi} \times \left(\frac{NP}{NS}\right)^2 \times RO \qquad (2)$$

wherein RO is output resistance, and NP/NS is turn ratio (primary side to secondary side) of the transformer TR.

In the first resonant state, the first control potential VGA and the second control potential VGC output by the controller 205 are both at zero voltage level, and therefore auxiliary switches QXA and QXC are turned-off. The auxiliary switches QXB and QXD are turned-on because the output potential VO1 of the resonant converter 200 is a stable voltage of 19.5V, for example. Consequently, in the first resonant state, in the resonant tank 202, the total resonant inductance value LRT is the inductance of the resonant inductor LR, and the total resonant capacitance value CRT is the capacitance of the resonant capacitor CR. In this embodiment, the quality factor Q becomes, for example, 2.0.

In the second resonant state, the first control potential VGA and the second control potential VGC output by the controller 205 are at high voltage level and zero voltage level, and therefore the auxiliary switches QXA and QXC are turned-on and turned-off, respectively. The auxiliary switches QXB and QXD are turned-on because the output potential VO1 of the resonant converter 200 is a stable voltage of 19.5V, for example. Consequently, in the second resonant state, in the resonant tank 202, the total resonant inductance value LRT is the inductance of the resonant inductor LR connected in parallel with the auxiliary inductor LRX, and the total resonant capacitance value CRT is the capacitance of the resonant capacitor CR. In this embodiment, the quality factor Q becomes, for example, 1.0.

In the third resonant state, the first control potential VGA and the second control potential VGC output by the controller 205 are at high voltage level, and therefore the auxiliary switches QXA and QXC are turned-on. The auxiliary switches QXB and QXD are turned-on because the output potential VO1 of the resonant converter 200 is at stable voltage of 19.5V, for example. Consequently, in the third resonant state, in the resonant tank 202, the total resonant inductance value LRT is the inductance of the resonant inductor LR connected in parallel with the auxiliary inductor LRX, and the total resonant capacitance value CRT is the capacitance of the resonant capacitor CR connected in parallel with the auxiliary capacitor CRX. In this embodiment, the quality factor Q becomes, for example, 0.5.

The configuration comparison of the resonant tank 202 of the resonant converter 200 according to the present disclosure is shown in Table 1.

TABLE 1

| | IDA (Amp.) | State of auxiliary switches | Configuration of resonant tank | Quality factor (Q) |
|---|---|---|---|---|
| First resonant state | <IOMAX × 65% | QXA (OFF) QXB (ON) QXC (OFF) QXD (ON) | LRT = LCR CRT = CR | 2.0 |
| Second resonant state | ≥IOMAX × 65% <IOMAX × 85% | QXA (ON) QXB (ON) QXC (OFF) QXD (ON) | LRT = LR//LRX CRT = CR | 1.0 |
| Third resonant state | ≥IOMAX × 85% | QXA (ON) QXB (ON) QXC (ON) QXD (ON) | LRT = LR//LRX CRT = CR//CRX | 0.5 |

Figure 4A:
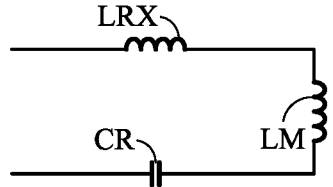
FIG. 4A shows the connecting configuration of inductor and capacitor in the resonant tank 2022 when the resonant converter 200 of the present disclosure is in a first resonant state.
Figure 4B:
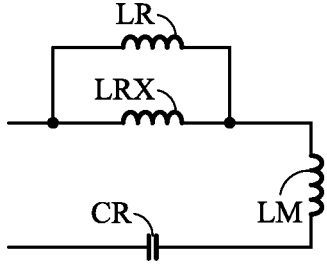
FIG. 4B shows the connecting configuration of inductor and capacitor in the resonant tank 2022 when the resonant converter 200 of the present disclosure is in a second resonant state.
Figure 4C:
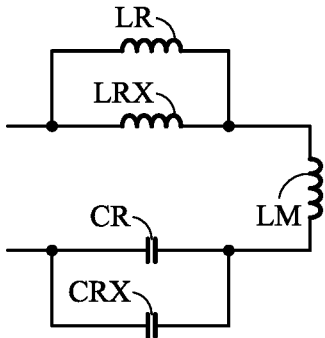
FIG. 4C shows the connecting configuration of inductor and capacitor in the resonant tank 2022 when the resonant converter 200 of the present disclosure is in a third resonant state.

FIG. 4A to FIG. 4C show the connecting configurations of inductor and capacitor in the resonant tank 2022 when the resonant converter 200 of the present disclosure is in the first to third resonant state.

Figure 5:
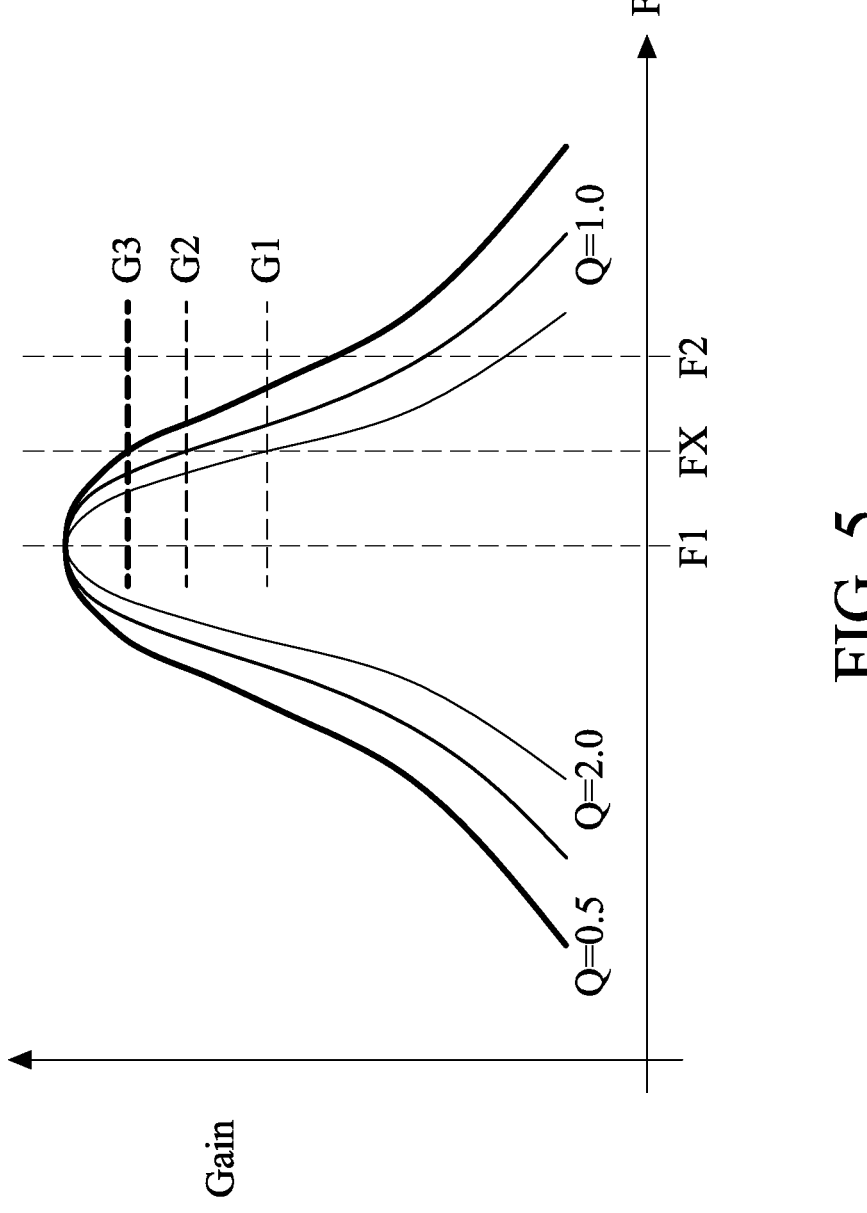
FIG. 5 shows the resonant gain curve of the resonant converter of the present disclosure, which can adaptively tune the quality factor based on the load.

FIG. 5 shows the resonant gain curves of the resonant converter 200 of the present disclosure which can adaptively tune the quality factor based on the load. The resonant converter 200 according to the present disclosure has three resonant states corresponding to three quality factors (Q values), and the Q values are 2.0, 1.0, and 0.5; and the range of the operating frequency is F1 to F2.

The first power switch Q1 and the second power switch Q2 of the resonant converter 200 operate at the switch frequency FX. In view of FIG. 5, it is quite clear that the lower the quality factor is, the greater (voltage) gain can be obtained, for the switching frequency FX. In a situation where the load of the resonant converter 200 becomes heavy and the power loss of the connection wire increases, the resonant converter 200 can decrease the quality factor for raising the voltage gain, thereby preventing insufficient output voltage. For example, in the first resonant state (Q=2.0) with gain G1, the resonant converter 200 can tune the Q value (quality factor) as 1.0 to raise the gain to G2 according to the load if the previous situation occurs. If it is still insufficient for the load, the Q value can be further adjusted to 0.5 to enter the third resonant state (Q=0.5), so that the gain can be further increased to G3.

Compared with the conventional resonant converter, the resonant converter according to the present disclosure can adaptively tune the quality factor according to the load, by detecting the rectified current of the output stage to respond to the load condition, and adjust the resonant tank according to the load condition. The resonant configuration and quality factor are tuned adaptively to avoid insufficient output voltage.

It is worth noting that the above-mentioned potential, current, resistance inductance, capacitance, and other component parameters are not limiting conditions of the present invention. Designers can adjust these settings according to different needs. The resonant converter of the present disclosure is not limited to the state shown in FIG. 2. The present disclosure may include any one or more features of any one or more embodiments of the preceding figures. In other words, not all features shown in the figures need to be implemented in the resonant converter of the present disclosure at the same time. Although the embodiment of the present invention uses metal oxide semiconductor transistors as an example, the present disclosure is not limited thereto. Those skilled in the art can use other types of transistors, such as junction field effect transistors, or junction field effect transistors, fin field effect transistors, etc., without affecting the effect of the present invention.

The ordinal numbers in this specification and the scope of the patent application, such as "first", "second", "third", etc., have no sequential relationship with each other. They are only used to indicate and distinguish between two different components with the same name. Although the present invention is disclosed above in terms of preferred embodiments, they are not intended to limit the scope of the invention. Anyone skilled in the art can make slight changes and modifications without departing from the spirit and scope of the invention. Therefore, the protection scope of the present invention shall be determined by the appended patent application scope.

What is claimed is:

1. A resonant converter capable of adaptively tuning a quality factor based on a load, comprising:
   a power switch circuit, receiving an input direct-current (DC) potential for generating a switching potential;
   a resonant tank, receiving the switching potential, including:
   an inductor part, having an inductance tuned according to a first control potential;
   a magnetizing inductor; and
   a capacitor part, having a capacitance tuned according to a second control potential;
   a transformer, including a primary winding and a first secondary winding, wherein the primary winding is coupled to the magnetizing inductor;
   an output stage, coupled to a first terminal and a second terminal of the transformer, which includes a rectifying device, a detecting resistor, and an output capacitor;
   an averaging circuit, coupled to a first terminal and a second terminal of the detecting resistor, for obtaining and outputting an average potential, wherein the average potential corresponds to an average current flowing through the rectifying device; and
   a controller, receiving the average potential, and outputting the first control potential and the second control potential;
   wherein the inductor part, the magnetizing inductor, and the capacitor part are connected in series, and arranged together between a first node and a first reference ground;
   the first node is coupled to the switching potential;
   the inductor part includes a resonant inductor, at least one auxiliary inductor, and a first auxiliary switch set;

the capacitor part includes a resonant capacitor, at least one auxiliary capacitor, and a second auxiliary switch set;
   wherein the first auxiliary switch set changes the connecting configuration of the resonant inductor and the auxiliary inductor according to the first control potential;
   wherein the second auxiliary switch set changes the connecting configuration of the resonant capacitor and the auxiliary capacitor according to the second control potential;
   wherein the transformer further includes a second secondary winding;
   the rectifying device includes a first rectifying component and a second rectifying component;
   the first secondary winding and the second secondary winding both have a first terminal and a second terminal;
   a first terminal and a second terminal of the first rectifying component are respectively coupled to the first terminal of the first secondary winding and the first terminal of the detecting resistor;
   a first terminal and a second terminal of the second rectifying component are respectively coupled to the second terminal of the second secondary winding and the first terminal of the detecting resistor;
   the second terminal of the first secondary winding is coupled to the first terminal of the second secondary winding and a second reference ground; and
   the output capacitor has a first terminal and a second terminal, the first terminal of the output capacitor is coupled to the second terminal of the detecting resistor, and the second terminal of the output capacitor is coupled to the second reference ground.

2. The resonant converter as claimed in claim 1, wherein the resonant inductor is coupled to the first node and a second node;
   the first auxiliary switch set includes a first switch, which is connected in series with the auxiliary inductor, and is arranged together with the auxiliary inductor between the first node and the second node;
   the resonant capacitor is coupled to a third node and the first reference ground;
   the second auxiliary switch set includes a second switch, which is connected in series with the auxiliary capacitor, and is arranged together with the auxiliary capacitor between the third node and the first reference ground;
   a control terminal of the first switch is coupled to the first control potential; and
   a control terminal of the second switch is coupled to the second control potential.

3. The resonant converter as claimed in claim 2, wherein the first auxiliary switch set further includes a third switch, and the first switch, the auxiliary inductor, and the third switch are connected in series, and arranged together between the first node and the second node;
   the second auxiliary switch set further includes a fourth switch, and the second switch, the auxiliary capacitor, and the fourth switch are connected in series, and arranged together between the third node and the first reference ground; and
   the control terminals of the third switch and the fourth switch are coupled to an output potential of the output capacitor.

4. The resonant converter as claimed in claim 1, wherein the first rectifying component and the second rectifying component are diodes;
the first terminals of the first rectifying component and the second rectifying component are anodes; and
the second terminals of the first rectifying component and the second rectifying component are cathodes.

5. The resonant converter as claimed in claim 4, wherein the power switch circuit has a first power switch and a second power switch;
the first power switch and the second power switch are connected in series, and are arranged between the DC potential and the reference ground.

6. The resonant converter as claimed in claim 5, wherein the first power switch and the second power switch perform complementary turn-on and turn-off operations according to a first switching potential and a second switching potential.

7. The resonant converter as claimed in claim 6, wherein the controller outputs the first switching potential and the second switching potential; and
the first switching potential and the second switching potential are complementary pulse width modulation potential.

* * * * *